(12) United States Patent
Ristoski et al.

(10) Patent No.: US 12,223,530 B2
(45) Date of Patent: Feb. 11, 2025

(54) METHOD, SYSTEM, AND COMPUTER PROGRAM PRODUCT FOR REPRESENTATIONAL MACHINE LEARNING FOR PRODUCT FORMULATION

(71) Applicant: International Business Machines Corporation, Armonk, NY (US)

(72) Inventors: Petar Ristoski, San Jose, CA (US); Richard T. Goodwin, Dobbs Ferry, NY (US); Jing Fu, Yorktown Heights, NY (US); Richard B. Segal, Chappaqua, NY (US); Robin Lougee, Yorktown Heights, NY (US); Kimberly C. Lang, Yorktown Heights, NY (US); Christian Harris, Port Chester, NY (US); Tenzin Yeshi, New York, NY (US)

(73) Assignee: International Business Machines Corporation, Armonk, NY (US)

(*) Notice: Subject to any disclaimer, the term of this patent is extended or adjusted under 35 U.S.C. 154(b) by 540 days.

(21) Appl. No.: 17/030,509

(22) Filed: Sep. 24, 2020

(65) Prior Publication Data

US 2022/0092659 A1 Mar. 24, 2022

(51) Int. Cl.
*G06Q 30/06* (2023.01)
*G06N 5/022* (2023.01)
(Continued)

(52) U.S. Cl.
CPC ......... *G06Q 30/0621* (2013.01); *G06N 5/022* (2013.01); *G06N 5/025* (2013.01)

(58) Field of Classification Search
CPC ................ G06Q 30/06; G06Q 30/0621
See application file for complete search history.

(56) References Cited

U.S. PATENT DOCUMENTS 10,255,269 B2 * 4/2019 Quirk ............... G06F 16/243
10,445,654 B2 10/2019 Glass et al.
(Continued)

FOREIGN PATENT DOCUMENTS

CN 110246542 A 9/2019

OTHER PUBLICATIONS

Hozouri, N.; Advancing National Health Through Investigations of Nutrition, Medical Expenditure, and Public Insurance Programs (ProQuest No. 27999593). (Year: 2020).*
(Continued)

*Primary Examiner* — Jeffrey A. Smith
*Assistant Examiner* — Jennifer V Lee
(74) *Attorney, Agent, or Firm* — Jared C. Chaney

(57) ABSTRACT

A method, system, and computer program product for representational learning of product formulas are provided. The method accesses a set of product formulas. Each product formula includes a set of ingredient tuples. A directed graph is generated from the set of product formulas. The directed graph including a node for each ingredient of the sets of ingredient tuples of the set of formulas. The method generates a weighted graph from the directed graph. The weighted graph has a weight assigned to each edge in the directed graph. The method generates an embedding model based on the directed graph. A set of embeddings is determined for the weighted graph where each node is represented with low-dimensional numerical vectors.

17 Claims, 7 Drawing Sheets

(51) Int. Cl.
*G06N 5/025* (2023.01)
*G06Q 30/0601* (2023.01)

(56) References Cited

U.S. PATENT DOCUMENTS

| | | |
|---|---|---|
| 10,445,811 B2 | 10/2019 | Chacko et al. |
| 10,528,997 B2 | 1/2020 | Mi et al. |
| 10,657,179 B2 | 5/2020 | Thompson et al. |
| 10,678,601 B2 | 6/2020 | Wong et al. |
| 10,699,280 B2 | 6/2020 | Sheth et al. |
| 2006/0174190 A1 | 8/2006 | Gomes |
| 2010/0251210 A1 | 9/2010 | Amaral |
| 2017/0249547 A1* | 8/2017 | Shrikumar ............. G06N 3/045 |
| 2017/0372197 A1 | 12/2017 | Baughman et al. |
| 2018/0075369 A1* | 3/2018 | Calmon ............. G06Q 10/0637 |
| 2019/0197564 A1 | 6/2019 | Calmon et al. |
| 2020/0019861 A1 | 1/2020 | Jeong |
| 2020/0034418 A1 | 1/2020 | Byron et al. |
| 2020/0125907 A1 | 4/2020 | Sheth et al. |

OTHER PUBLICATIONS

International Search Report and Written Opinion for Application PCT/CN2021/118730, Nov. 26, 2021, 8 pages.

Ahn et al., "Flavor network and the principles of food pairing", Scientific Reports. Published Dec. 15, 2011, DOI: 10.1038/srep00196, 7 pages. https://www.nature.com/articles/srep00196.

Teng et al., Recipe recommendation using ingredient networks, Proceedings of the 3rd Annual ACM Web Science Conference (WebSci'12) (2012), 10 pages. https://dl.acm.org/citation.cfm?id=2380757.

Diwan, "A Named Entity Based Approach to Model Recipes", arXiv:2004.12184v1 [cs.CL] Apr. 25, 2020, 6 pages.

Mai et al., "Support and centrality: Learning weights for knowledge graph embedding models", European Knowledge Acquisition Workshop, Springer, 2018, 15 pages. https://geog.ucsb.edu/~jano/2018-EKAW18_TransRW.pdf.

Cochez et al., "Biased graph walks for RDF graph embeddings", In Proceedings of the 7th International Conference on Web Intelligence, Mining and Semantics, ACM, 2017, 12 pages. https://dl.acm.org/citation.cfm?id=3102279.

Sauer et al., "Cooking up Food Embeddings Understanding Flavors in the Recipe-Ingredient Graph", A CS224W Project Report, printed Aug. 13, 2020, 12 pages.

Chen, "A Statistical Machine Learning Approach to Generating Graph Structures from Food Recipes", Master's Thesis, Aug. 2017, Master of Arts in Computational Linguistics, 53 pages.

Zamparelli et al., "Ingredient-driven Recipe Generation Using Neural and Distributional Models", Master's Thesis, Date of Submission Jul. 17, 2017, Co-funded by the Erasmus+ Programme of the European Union, 61 pages.

Park et al., "KitcheNette: Predicting and Ranking Food Ingredient Pairings using Siamese Neural Networks", Proceedings of the Twenty-Eighth International Joint Conference on Artificial Intelligence (IJCAI-19), 7 pages.

Mell et al., "The NIST Definition of Cloud Computing", Recommendations of the National Institute of Standards and Technology, Special Publication 800-145, Sep. 2011, 7 pages.

* cited by examiner

METHOD, SYSTEM, AND COMPUTER PROGRAM PRODUCT FOR REPRESENTATIONAL MACHINE LEARNING FOR PRODUCT FORMULATION

BACKGROUND

Product design activities may include perfumers, flavorists, food-product developers, and other skill sets. Often the product development and design process takes years of human effort. Artificial intelligence (AI) and machine learning have been adopted into various industries and activities, including product development and design. Some AI and machine learning systems used in product development and design processes use data pre-processing and data representation. These AI and machine learning systems often employ general domains with limited elements. These AI and machine learning systems often provide limited real-world suggestions, application, or approaches to product development and design workers.

SUMMARY

According to an embodiment described herein, a computer-implemented method for representational learning of product formulas is provided. The method accesses a set of product formulas. Each product formula includes a set of ingredient tuples. A directed graph is generated from the set of product formulas. The directed graph including a node for each ingredient of the sets of ingredient tuples of the set of formulas. The method generates a weighted graph from the directed graph. The weighted graph has a weight assigned to each edge in the directed graph. The method generates an embedding model based on the weighted graph. A set of embeddings is determined for the weighted graph where each node is represented with low-dimensional numerical vectors.

According to an embodiment described herein, a system for representational learning of product formulas is provided. The system includes one or more processors and a computer-readable storage medium, coupled to the one or more processors, storing program instructions that, when executed by the one or more processors, cause the one or more processors to perform operations. The operations access a set of product formulas. Each product formula includes a set of ingredient tuples. A directed graph is generated from the set of product formulas. The directed graph including a node for each ingredient of the sets of ingredient tuples of the set of formulas. The operations generate a weighted graph from the directed graph. The weighted graph has a weight assigned to each edge in the directed graph. The operations generate an embedding model based on the weighted graph. A set of embeddings is determined for the weighted graph where each node is represented with low-dimensional numerical vectors.

According to an embodiment described herein, a computer program product for representational learning of product formulas is provided. The computer program product includes a computer-readable storage medium having program instructions embodied therewith, the program instructions being executable by one or more processors to cause the one or more processors to access a set of product formulas. Each product formula includes a set of ingredient tuples. A directed graph is generated from the set of product formulas. The directed graph including a node for each ingredient of the sets of ingredient tuples of the set of formulas. The computer program product generates a weighted graph from the directed graph. The weighted graph has a weight assigned to each edge in the directed graph. The computer program product generates an embedding model based on the weighted graph. A set of embeddings is determined for the weighted graph where each node is represented with low-dimensional numerical vectors.

DETAILED DESCRIPTION

Figure 1:
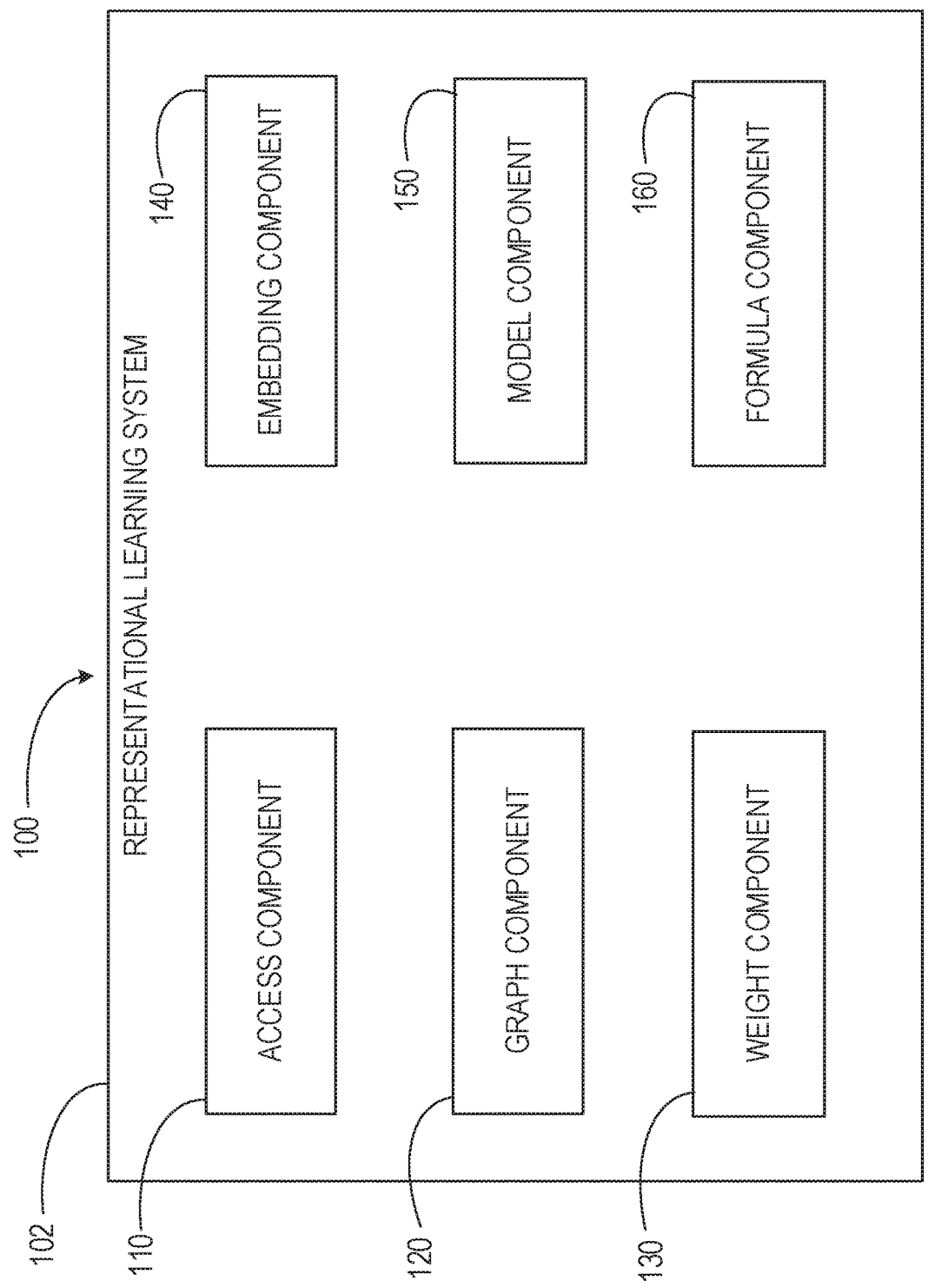
FIG. 1 depicts a block diagram of a computing environment for implementing concepts and computer-based methods, according to at least one embodiment.

The present disclosure relates generally to methods for representational computer learning. More particularly, but not exclusively, embodiments of the present disclosure relate to a computer-implemented method for representational learning of product formulas and ingredients. The present disclosure relates further to a related system for representational computer learning, and a computer program product for operating such a system.

Product development and design often employs professionals who take years to train. Once product development and design professionals leave, an experience deficit occurs that takes time to overcome. Many companies create and test hundreds or thousands of designs, whether or not those designs are brought to market. Previously developed or designed products are often not considered during new product development cycles. Despite training and experience, product development and design professionals have limited ability or bandwidth to access, understand, and consider previously developed or designed products when tasked with designing new products.

AI and machine learning techniques have been adopted in various industries. AI has been used in limited ways to assist in formula development for cosmetic products, perfumes, spices, food, clothes and shoes, and other physical products. AI systems often leverage data pre-processing and data representation to perform modeling or learning functions. The process of identifying data representation for a given task may be understood as representational learning. Currently, most AI systems work on general domains, such as food recipes with limited components or ingredients. These AI systems generally ignore ingredient amounts. Similarly, these AI systems generally consider no additional features or characteristics related to ingredients. Further, these AI systems often provide no real-world applications or approaches.

Embodiments of the present disclosure provide methods and systems for representational learning for product formulas. These product formulas may consist of a set of ingredients, with each ingredient having a set of features. These features may be numerical and categorical in nature. Embodiments of the present disclosure consider each ingredient in varying amounts for generation of product formulas. The present disclosure provides methods and systems which perform varying machine learning approaches. These machine learning approaches may be run on data including product and ingredient recommendations, substitute or compliment ingredient recommendation, and generating new product formulas. Embodiments of the present disclosure employ machine and representational learning techniques to classify and cluster products and ingredients for varying applications.

Embodiments of the present disclosure provide representational learning for product formulas and ingredients. Existing product formulas may be used as input to generate an embedding model for all ingredients used in the provided product formulas. These formulas and ingredients are converted into weighted directed graphs. Embodiments of the present disclosure may use differing weighting approaches and consider cooccurrence of different ingredients among the provided product formulas. When ingredients are presented in a graph, embodiments of the present disclosure apply a plurality of embedding approaches to determine embedded vectors for each ingredient in the provided product formulas. A single vector for each product formula is then generated using vectors for the ingredients. Embodiments of the present disclosure enable machine learning-based ideation and formulation of new products. The present disclosure may employ iterative machine learning to generate candidates, compounds, and bench testing of new products and formulations. Embodiments of the present disclosure learn combinations of raw materials, suggest new materials, and consider wider ranges of options in generating new products. Embodiments of the present disclosure enable white space identification within a set of products and enable generation of new products within identified white spaces.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a representational learning system 102. The representational learning system 102 may comprise an access component 110, a graph component 120, a weight component 130, an embedding component 140, a model component 150, and a formula component 160. The access component 110 accesses a set of product formulas with each product formula including a set of ingredient tuples. The graph component 120 generates a directed graph from the set of product formulas that includes a node for each ingredient of the sets of ingredient tuples of the set of formulas. The weight component 130 generates a weighted graph from the directed graph. The model component 150 generates an embedding model based on the weighted graph. The embedding component 140 determines a set of embeddings for the weighted graph where each node is represented with low-dimensional numerical vectors. The formula component 160 generates a new formula based on the embedding model and the set of embeddings. Although described with distinct components, it should be understood that, in at least some embodiments, components may be combined or divided, and/or additional components may be added without departing from the scope of the present disclosure.

Figure 2:
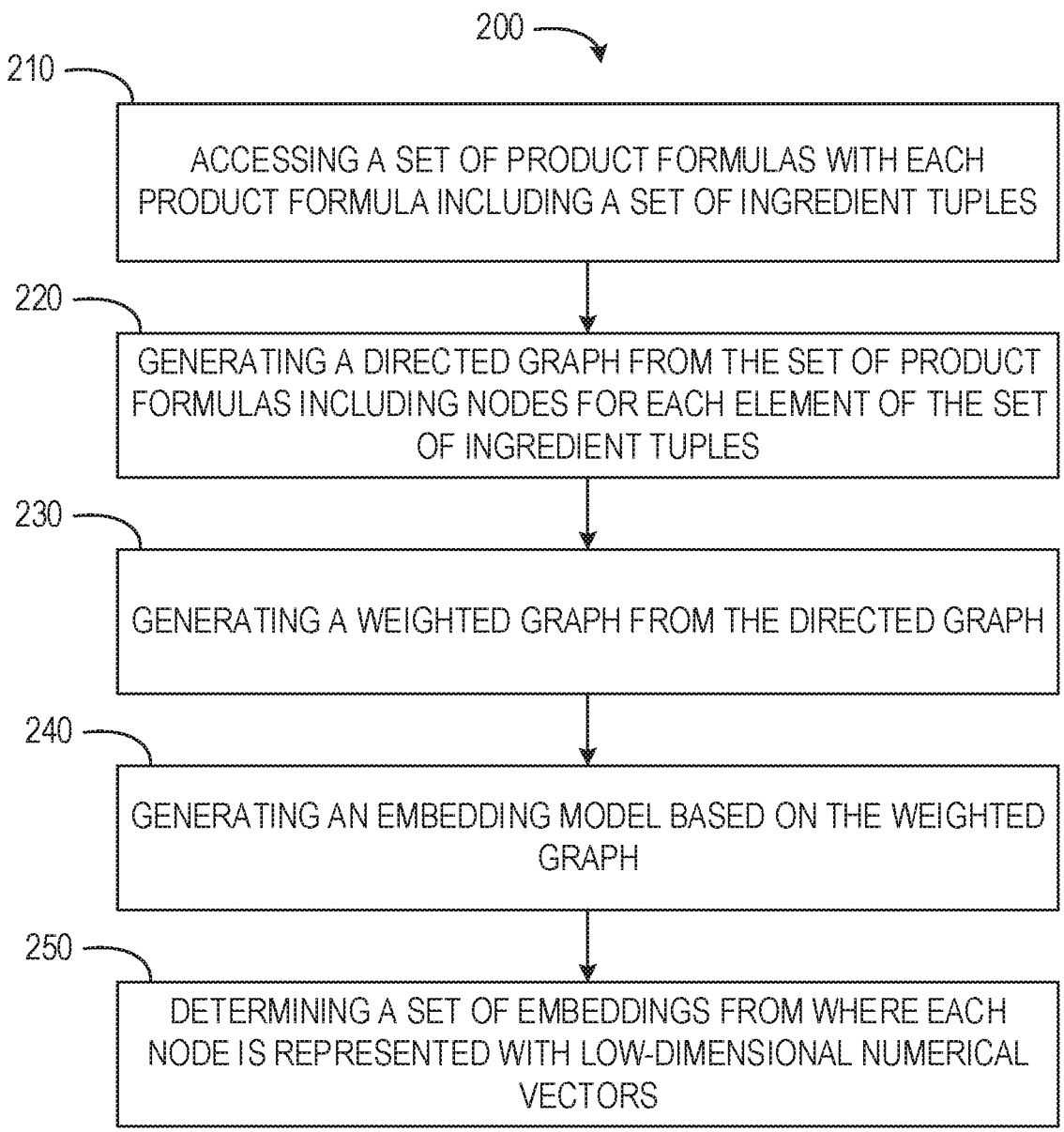
FIG. 2 depicts a flow diagram of a computer-implemented method for representational learning of product formulas, according to at least one embodiment.

Referring now to FIG. 2, a flow diagram of a computer-implemented method 200 is shown. The computer-implemented method 200 is a method for representational learning of product formulas. In some embodiments, the computer-implemented method 200 may be performed by one or more components of the computing environment 100, as described in more detail below.

At operation 210, the access component 110 accesses a set of product formulas. Each product formula includes a set of ingredient tuples. The access component 110 may access the set of product formulas by receiving the set of product formulas as input passed to the representational learning system 102. When received by the access component 110, the set of product formulas may be provided or received as a selected set of product formulas. The selected set of product formulas may be curated to represent a focus area, product line, specified product, historic product data, inspiration area, existing product field, combinations thereof, or any suitable curation of product formulas from a larger superset of product formulas.

In some instances, the access component 110 accesses the set of product formulas by accessing a formula repository. The formula repository may contain products associated with one or more entities and one or more industries. The access component 110 may be provided with one or more input, such as search criteria. The access component 110 may identify suitable product formulas from the formula repository and access the set of product formulas as a set of search results to provided search criteria. Crucial features may be treated differently than standard features, such as descriptive features or characterizations of ingredients. Standard features or characterizations may include an odor key or odor type (e.g., fruity, woody, musk), a category (e.g., solution, base, top, heart, bottom), a textual description (e.g., rich and fruity smell), a type (e.g., citrus or animal), chemical molecules, combinations thereof, or any other suitable description, feature, or characterization of an ingredient.

Each ingredient of a product formula may be represented as an ingredient tuple. The ingredient tuple identifies a single ingredient and an amount of the ingredient. Each ingredient may have a set of numerical and categorical features. Some types of features may be identified as crucial features for a given ingredient. Features having a high impact on how an ingredient is being used in a formula may be a crucial feature. For example, a potency of an ingredient, an amount of an ingredient, or a percentage of an ingredient within a formula may be considered crucial features.

The set of product formulas may be represented as a set of formulas (F), with individual product formulas (f). For example, the set of formulas F may be represented as F={$f_1$, $f_2$, ... $f_n$}. Each product formula may be represented for machine learning as a set of ingredient tuples. For example, product formula (f) may be represented as f={($i_1$, $a_{i1}$), ($i_2$, $a_{i2}$), ... ($i_n$, $a_{in}$)}. Each ingredient may have a set of numerical and categorical features. The set of numerical and categorical features may be represented as $i_x$={$x_1$, $x_2$, ... $x_n$}. Each ingredient may have a set of high-impact features represented as $i_{xs}$={$x_{s1}$, $x_{s2}$, ... $x_{sn}$}.

At operation 220, the graph component 120 generates a directed graph from the set of product formulas. In some embodiments, the directed graph includes a node for each element of the set of ingredient tuples. The directed graph may include a node for each ingredient of the sets of ingredient tuples of the set of formulas. Each ingredient tuple may identify an ingredient and one or more ingredient characteristics. The ingredient characteristics may include an amount of the ingredient and a set of categorical features of the ingredient. The set of product formulas, ingredients, ingredient characteristics, and set of categorical features of the ingredients may be represented in the directed graph. Thus, the directed graph may include a node for each ingredient and ingredient attribute or characteristic included in the input received in operation 210.

In some embodiments, each ingredient in the sets of ingredient tuples for the set of product formulas is converted into a graph node. In such embodiments, each ingredient, ingredient characteristic, and categorical feature of an ingredient is associated with a node in the directed graph. For each pair of ingredients that appear together in a given product formula, an edge is set in the graph between the nodes for the pair of ingredients. The edges between each ingredient and features of the ingredient may be labeled edges. In some embodiments, each pair of ingredients or each pair of ingredients and a feature or characteristic of the ingredient is assigned an edge in both directions in the directed graph.

At operation 230, the weight component 130 generates a weighted graph from the directed graph. The weighted graph may have a weight assigned to each edge in the directed graph. In some embodiments, the weighted graph includes two edges for each pair of nodes. Edges leading to nodes representing crucial features are provided additional weight within the weighted graph. In some embodiments, for each pair of nodes (i, j) in the directed graph, each node is described with a set of special features ($i_{xs}$). An edge (e) is set with a weight (w). The weight component 130 may generate the weighted graph using one or more weighing approaches.

In some embodiments, the directed graph is weighted using raw count weighting. In raw count weighting, a number of product formulas where both ingredients occur together are weighted. The formulas where two ingredients cooccur may be weighted with an amount of the ingredients and special features of the second ingredient in each formula. For example, raw count weighting may be represented as $ij_e = \Sigma a_j * xs_j | i$ and $j$ in $F$. As represented in the raw count weighting equation, for each pair of nodes (i, j) that appear together in at least one formula, an edge weight from i to j ma be calculated as a sum of the product of the amounts of the j ingredient and the special features in j.

In some embodiments, the directed graph is weighted using inverse document frequency. In such embodiments, a weight of an edge is calculated using an inverse document frequency equation. The inverse document frequency equation may be modified to take into consideration an amount of an ingredient and one or more special features of the ingredient. For example, an edge may be weighted as idf(i, F)=log (|F|/$\Sigma a_i * xs_i$). Using the inverse document frequency weighting, a weight may be the same for all incoming edges for a given node within the weighted graph. Inverse document frequency weighting may penalize frequent ingredients within the set of product formulas.

In some embodiments, the directed graph is weighted using lift. Lift may control for a support frequency of consequent ingredients while calculating conditional probability of occurrence. For example, lift weighting may be represented as Equation 1 where j is a conditional probability of occurrence given ingredient i.

$$ij_e = \frac{\text{support}(i \cup j)}{\text{support}(i) * \text{support}(j)} = \frac{\frac{\sum (a_i * xs_i + a_j * xs_j)}{\sum a_i * xs_i}}{\frac{\sum a_j * xs_j}{|F|}} \quad \text{Equation 1}$$

In some embodiments, the directed graph is weighted using pointwise mutual information. Pointwise mutual information may be represented as Equation 2.

$$ij_e = \log \frac{P(j|i)}{P(j)} = \log \frac{\frac{\sum (a_i * xs_i + a_j * xs_j)}{|F|}}{\frac{\sum a_i * xs_i}{|F|} * \frac{\sum a_j * xs_j}{|F|}} \quad \text{Equation 2}$$

In some embodiments, the directed graph is weighted using intersection over union. Intersection over union weighting may be represented as Equation 3.

$$ij_e = \frac{(\sum (a_i * xs_i + a_j * xs_j) | i \text{ and } j \text{ in } F)}{(\sum (a_i * xs_i + a_j * xs_j) | i \text{ or } j \text{ in } F)} \quad \text{Equation 3}$$

Although described with specified weighing approached, it should be understood that the directed graph may be weighted using any one or more weighing approach.

In some embodiments, the weighting component 130 generates the weighted graph by removing a subset of edges of the directed graph. The subset of edges removed from the directed graph may have a weight below a first threshold. The first threshold (t) may be understood as a cut-off value. Edges with a weight below t may be removed from the weighted graph.

At operation 240, the model component 150 generates an embedding model based on the weighted graph. The embedding model is an output of the representational learning system 102. The embedding model may provide embedded n-dimensional numerical vectors for each ingredient of the sets of ingredients for the set of product formulas. The n-dimensional numerical vectors may be used in various machine learning approaches as input for a plurality of tasks and applications. In some embodiments, the embedding model is a deep neural network generated using positive examples of product formulas. The positive examples may be examples of product formulas which gained a threshold level of market success or acceptance. The embedding model may be a generative adversarial network. In some instances, the embedding model is a bidirectional long short-term memory (BiLSTM) layer model.

At operation 250, the embedding component 140 determines a set of embeddings for the weighted graph where each node is represented with low-dimensional numerical vectors. The set of embeddings may include ingredient embeddings and formula embeddings. The ingredient embeddings may include ingredient tuples and an edge weight associated with the ingredient tuple as an ingredient triple. The embedding component 140 may exploit distance-based scoring functions to determine the set of embeddings. In some instances, the embedding component 140 measures a plausibility of a fact as a distance between two entities, nodes, or ingredients. In determining the set of embeddings, the embedding component 140 generates an n-dimensional vector for each ingredient in the sets of ingredients of the set of product formulas. Each ingredient is represented with n-dimensional vector as $i_1=[d_1, d_2, \ldots d_n]$, $i_2=[d_1, d_2, \ldots d_n]$, $\ldots$, $i_n=[d_1, d_2, \ldots d_n]$. The embedding component 140 may use modified approaches for vectorizing a formula based on ingredients within the formula. In some instances, embedding component 140 uses modified vectorizing approaches used in language modeling applications. Ingredient vectors may be used to generate formula vectors for the set of product formulas. The n-dimensional vectors may be used in machine learning approaches for varying applications and tasks.

Figure 3:
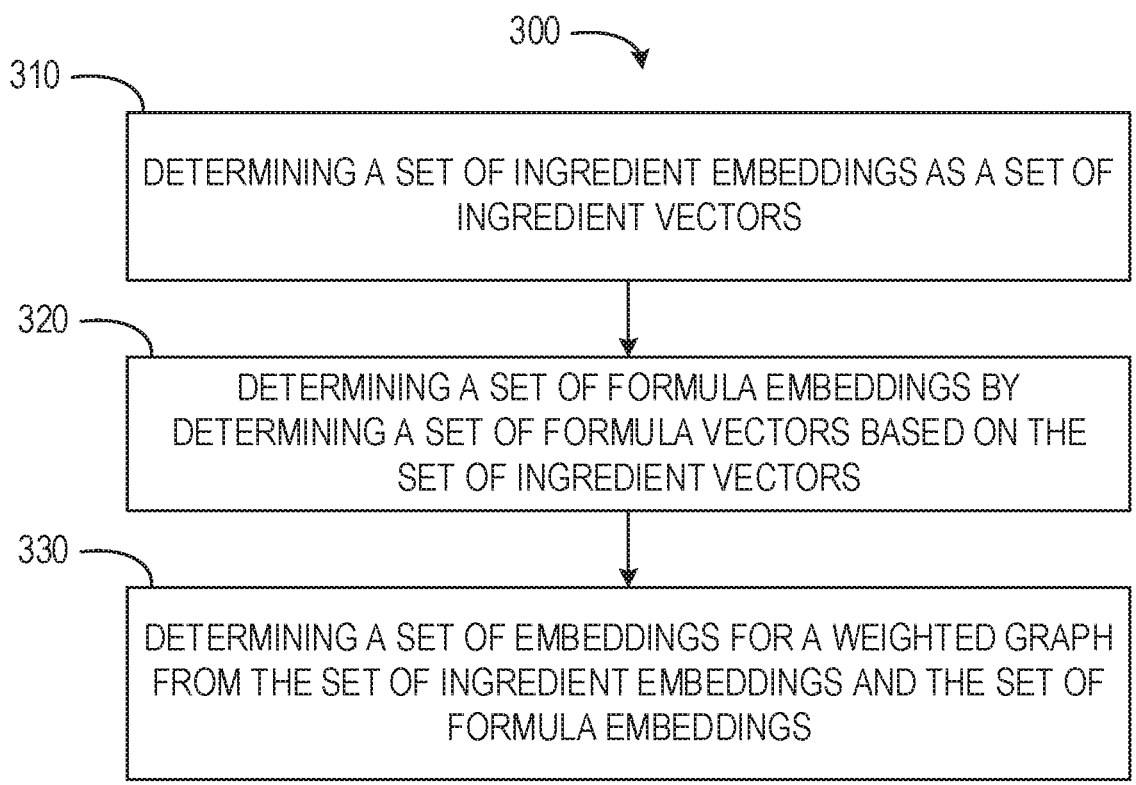
FIG. 3 depicts a flow diagram of a computer-implemented method for representational learning of product formulas, according to at least one embodiment.

FIG. 3 shows a flow diagram of an embodiment of a computer-implemented method 300 for representational learning of product formulas. The method 300 may be performed by or within the computing environment 100. In some embodiments, the method 300 comprises or incorporates one or more operations of the method 200. In some instances, operations of the method 300 may be incorporated as part of or sub-operations of the method 200, such as operation 250.

In operation 310, the embedding component 140 determines a set of ingredient embeddings based on the embedding model. The embedding component 140 may determine the set of ingredient embeddings as a set of ingredient vectors. The set of ingredient vectors may be determined for ingredients identified by the set of ingredient tuples or ingredient triples. The set of ingredient vectors may be determined based on a similarity between ingredients. Similarity between ingredients may be determined in a range of [0,1] using vector similarity functions such as cosine and Euclidian similarity. For example, the set of ingredient vectors may be determined based on similarities among ingredients among the set of product formulas. The similarity of ingredients may be used to generate a similarity matrix.

In some embodiments, the embedding component 140 determines the set of ingredient embeddings using translation-based models. The translation-based models may include TransE, TransR, and TransH. The embedding component 140 may use the translation-based models to measure plausibility of a fact as a distance between two entities. The embedding component 140 may measure the plausibility of the fact after a translation is carried out by the relation.

In some embodiments, the embedding component 140 determines the set of ingredient embeddings using semantic matching models. The semantic matching models may include HolE and ComplEx. The embedding component 140 may use the similarity-based scoring functions to measure plausibility of facts. The plausibility of facts may be measured by matching latent semantics of entities, such as nodes, and relations. The entities and relations may be embodied in the vector space representations of the set of ingredients.

In some embodiments, the embedding component 140 determines the set of ingredient embeddings using random walk models. The random walk models may include RDF2vec, DeepWalk, and Node2vec. The embedding component 140 may perform random walk on the weighted graph from each node. The embedding component 140 may capture features of the graph neighborhood. A set of random walks may then be fed into one or more deep learning approaches to determine the set of ingredient embeddings and the set of ingredient vectors. In using random walk models, the embedding component 140 extracts a subgraph with depth d, extracts n biased walks in the subgraph, and builds a neural model for each entity in the weighted graph.

The embedding component 140 may combine one or more of the translation-based models, semantic matching models, and random walk models to determine the set of ingredient embeddings and the set of ingredient vectors. The translation-based models and semantic matching models may use pairwise ranking loss functions for training. The pairwise ranking loss functions may include a weight of an edge of a graph when calculating the loss. In such instances, the embedding component 140 provides different importance for different edges of the weighted graph.

The random walk models may be used with biased walks by the embedding component 140. The weight of an edge may be incorporated in the random walk model. In such instances, the weight of the edge provides the bias for the biased walk on the weighted graph. Using the biased walks, a probability of the embedding component 140 following an edge may be equal to an edge weight. The probability of following an edge may also be normalized by a weight of all outgoing edges from a current node. In such instances, the random walk models may be represented as Equation 4.

$$Pr|\text{follow edge } v_{ol}| = \frac{\text{weight}(v_{ol})}{\sum_{i=1}^{d} \text{weight}(v_{oi})} \quad \text{Equation 4}$$

In operation 320, the embedding component 140 determines a set of formula embeddings. The embedding component 140 may determines the set of formula embeddings by determining a set of formula vectors based on the set of ingredient vectors. The set of formula vectors may include a formula vector for each product formula of the set of product formulas. The embedding component 140 may use one or more of the set of ingredient embeddings, the set of ingredient vectors, or the similarity matrix of the set of ingredient vectors to determine the formula vectors for each formula of the set of formulas from operation 210.

The embedding component 140 may average ingredient vectors for ingredients of a specified product formula to determine a formula vector for the specified product formula. In such instances, the formula vector may be determined as an averaged embedding vector of all ingredient vectors for ingredients within the product formula. The ingredient vectors may be weighted by a weight of each ingredient and an amount of each ingredient within the product formula to determine the averaged embedding vector.

In some embodiments, the embedding component 140 determines a formula vector for a specified product formula using concatenation. The embedding component may concatenate ingredient vectors for ingredients within the specified formula. The embedding component 140 concatenates the ingredient vectors into a single formula vector.

In some embodiments, the embedding component 140 determines the formula vector for a specified product formula using sequence-to-sequence neural networks. The embedding component 140 takes the ingredient vectors for all ingredients of the set of ingredients of a given product formula. The embedding component 140 produces a vector for the given product formula. The embedding component 140 may use encoder-decoder architectures or autoencoders for dimensionality reduction of the ingredient vectors to the formula vector.

In some embodiments, the embedding component 140 passes the set of ingredient embeddings or set of ingredient vectors through a convolutional neural network using one or more of the above-referenced models, such as averaging, concatenation, and sequence-to-sequence neural networks. The embedding component 140 may produce the set of formula embeddings or set of formula vectors as a sigmoid layer based on the output of the convolutional neural network.

In operation 330, the embedding component 140 determines a set of embeddings for the weighted graph. The embedding component 140 determines the set of embeddings from the set of ingredient embeddings and the set of formula embeddings. The set of embeddings may be determined in a manner similar to or the same as described above with respect to operation 240 using the set of ingredient embeddings in operation 310 and the set of formula embeddings in operation 320.

Figure 4:
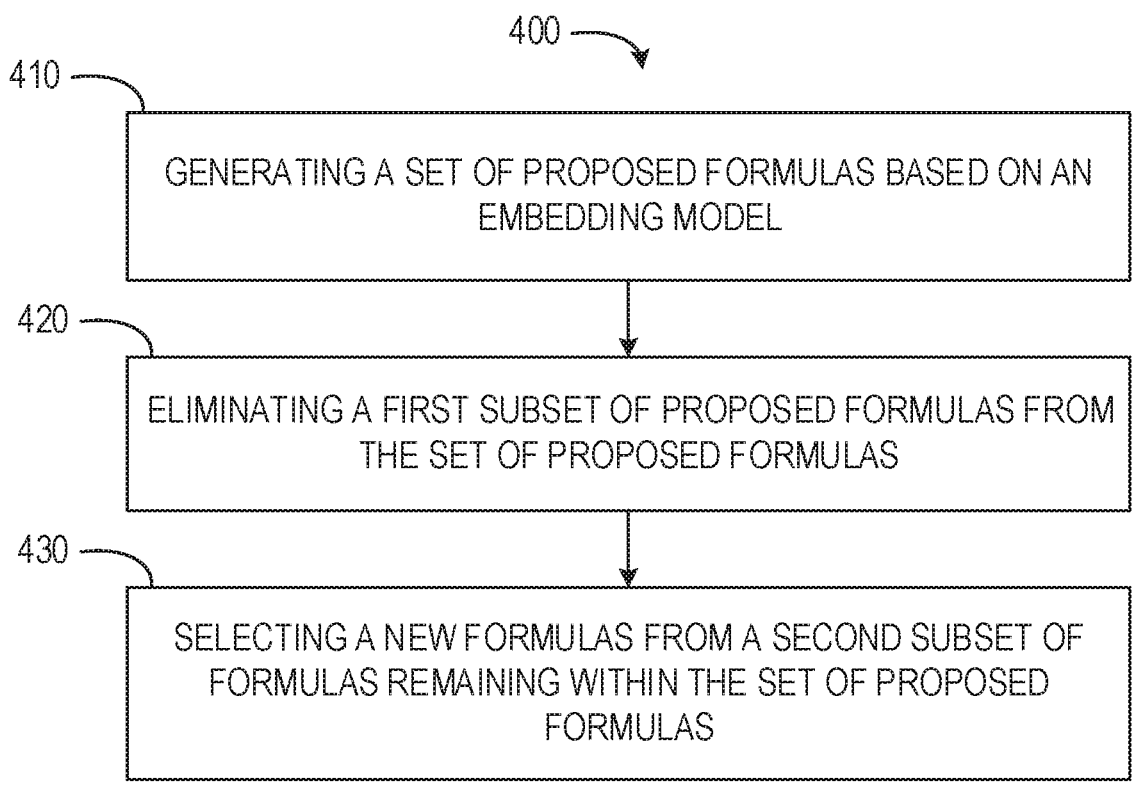
FIG. 4 depicts a flow diagram of a computer-implemented method for representational learning of product formulas, according to at least one embodiment.

FIG. 4 shows a flow diagram of an embodiment of a computer-implemented method 400 for representational learning of product formulas. The method 400 may be performed by or within the computing environment 100. In some embodiments, the method 400 comprises or incorporates one or more operations of the method 200. In some instances, operations of the method 400 may be incorporated as part of or sub-operations of the method 200.

In operation 410, the formula component 160 generates a set of proposed formulas. The set of proposed formulas may be generated based on the embedding model. In some instances, the set of proposed formulas are generated based on the embedding model and the set of embeddings. The proposed formulas may be based on the set of formulas accessed in operation 210. In some embodiments, the set of proposed formulas include one or more of a set of ingredient substitutes, a set of ingredient or formula compliments, a set of novel formulas.

In some embodiments, the formula component 160 generates the set of proposed formulas based on user interface input received from a user or from a market analysis of a group of products. The formula component 160 may receive user interface input such as desired product characteristics, inspiration keywords, specified ingredients, a focus area, combinations thereof, or any other suitable input. In some instances, the formula component 160 receives a specified formula from a market or focus area. The formula component 160 may then generate the set of proposed formulas by passing the user interface input or the specified formula through the embedding model of operation 250.

In operation 420, the formula component 160 eliminates a first subset of proposed formulas from the set of proposed formulas. The first subset of proposed formulas may be eliminated based on a similarity threshold to one or more formulas of the set of formulas accessed in operation 210. Similarly, the first subset of proposed formulas may be eliminated based on a similarity threshold to the specified formula received in operation 410. The first subset of formulas may have a similarity value which exceeds the similarity threshold. Exceeding the similarity threshold may indicate that proposed formulas within the first subset of formulas are too similar to at least one formula from the set of formulas accessed in operation 210. Elimination of the first subset of proposed formulas may result in a second subset of proposed formulas remaining from the set of proposed formulas.

In some embodiments, the formula component 160 eliminates the first subset of proposed formulas based on a similarity determined among the set of proposed formulas. The formula component 160 may determine that two or more proposed formulas are similar enough to exceed the similarity threshold. The formula component 160 may compare each of the two or more proposed formulas to historic formulas and market acceptance or success of the historic formulas. Based on the comparison, the formula component 160 selects for elimination at least one proposed formula of the two or more proposed formulas which are not predicted to perform well. For example, the formula component 160 may generate a similarity score for each of two proposed formulas, such as a first similarity score and a second similarity score. The similarity scores may be generated based on a similarity of the first and second proposed formulas to a successful product formula. Where the second formula is indicated by the second similarity score to be more similar to the successful product formula, but does not exceed the similarity threshold, the second formula is retained. The first formula may be eliminated based on being similar to the second proposed formula but too dissimilar relative to the successful product formula. In this way, the second proposed formula may be considered an innovative product (e.g., not too similar to a preexisting product), but sharing some characteristics of the previously successful product formula.

The first subset of proposed formulas may be excluded or eliminated for any number of reasons. For example, where the set of proposed formulas are generated to be aligned with a specified focus area, proposed formulas which fall outside a specified similarity to the focus area may be eliminated. By way of further example, where the set of proposed formulas are generated in product white space and novelty is desired, the first subset of proposed formulas may be eliminated for being too similar to existing product formulas. By way of additional example, where the set of proposed formulas are generated to be provocative or test boundaries of a focus area, the first subset of proposed formulas may be eliminated for being too similar to a core of the focus area or a current or preexisting product which is identified as being a core product within the focus area.

In operation 430, the formula component 160 selects or generates a new formula from the second subset of formulas remaining within the set of proposed formulas. In some embodiments, the new formula may be selected or generated based on, or in response to, eliminating the first subset of formulas. The formula component 160 may select the new formula from the second subset of formulas based on a similarity to a desired product formula, novelty of the new formula, relation of the new formula to a focus area, ingredients within the new formula, cost or profit ratio of the new formula, combinations thereof, or any other suitable criteria.

Figure 5:
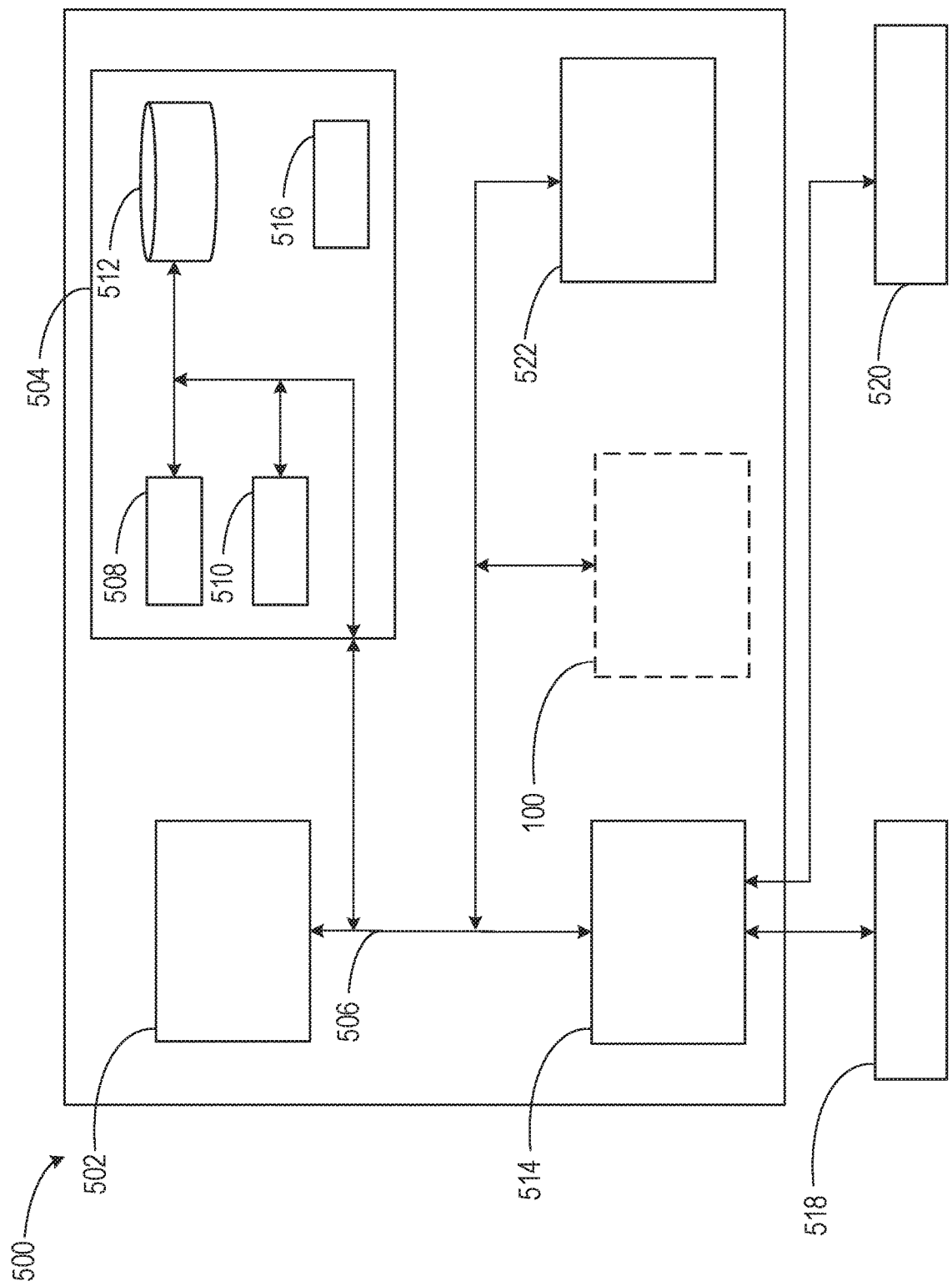
FIG. 5 depicts a block diagram of a computing system for representational learning of product formulas, according to at least one embodiment.

Embodiments of the present disclosure may be implemented together with virtually any type of computer, regardless of the platform is suitable for storing and/or executing program code. FIG. 5 shows, as an example, a computing system 500 (e.g., cloud computing system) suitable for executing program code related to the methods disclosed herein and for representational learning of product formulas.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the access component 110, the graph component 120, the weight component 130, the embedding component 140, the model component 150, and the formula component 160, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
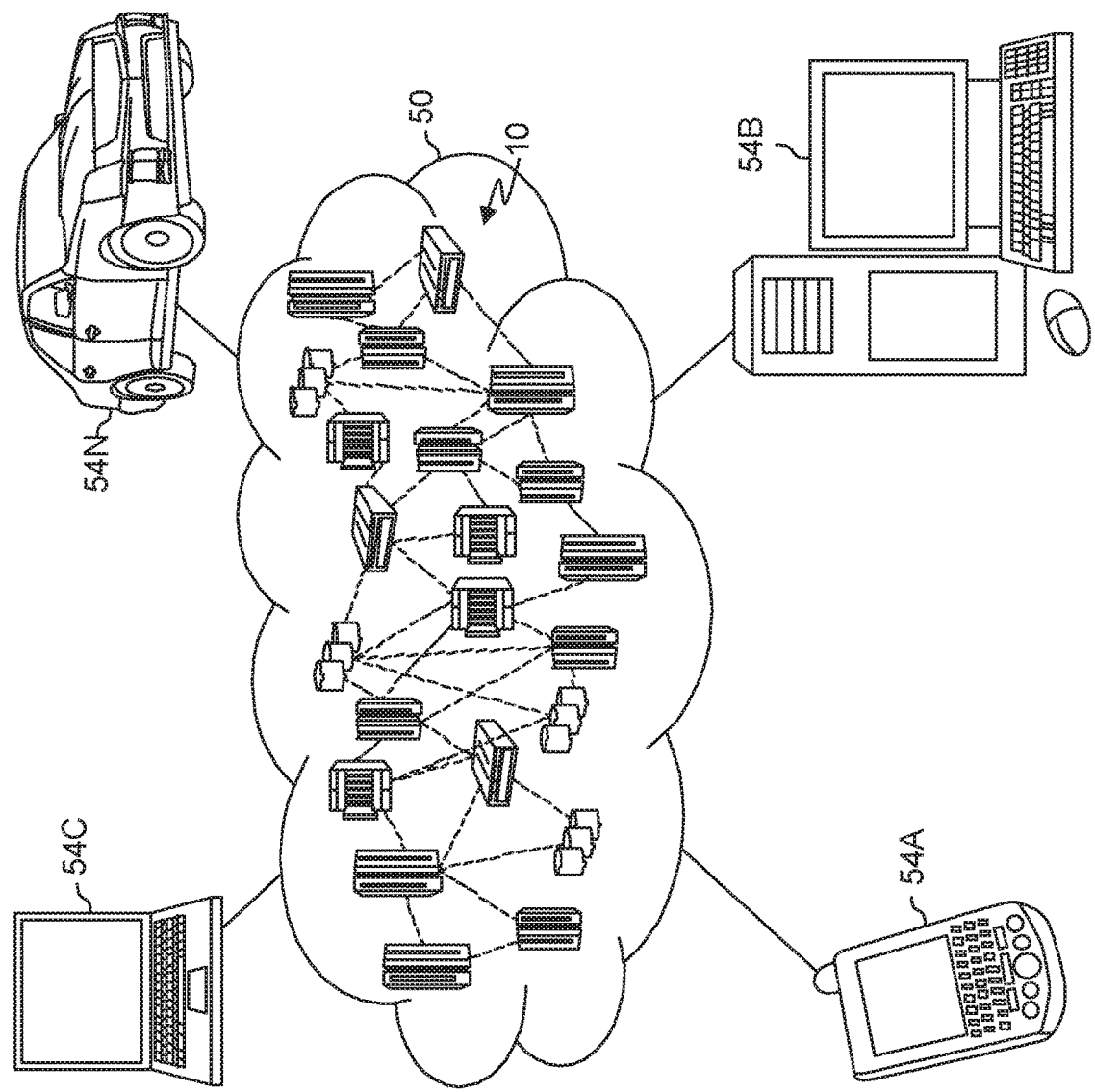
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
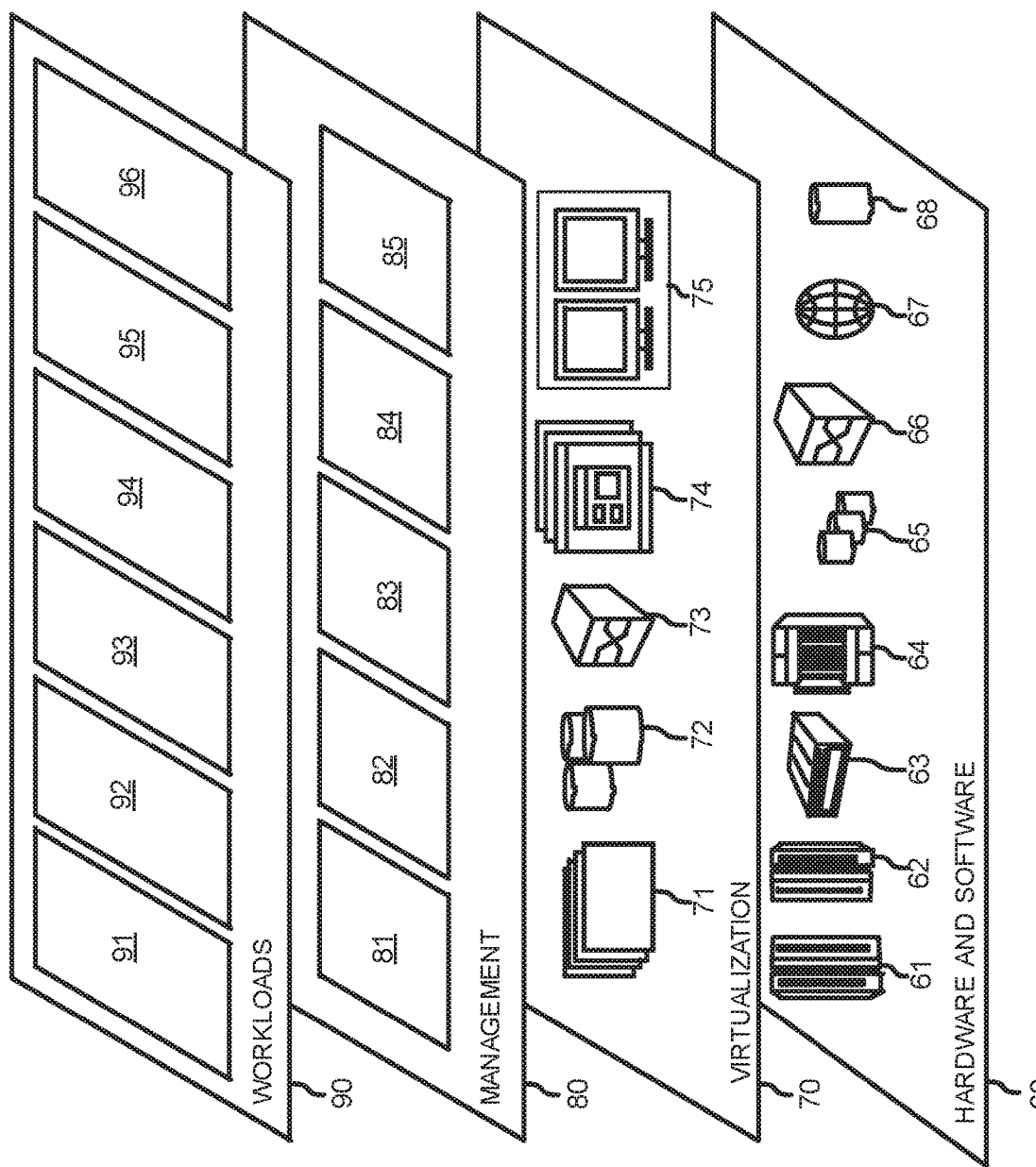
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and representational learning processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   accessing a set of product formulas, each product formula including a set of ingredient tuples;
   generating a directed graph from the set of product formulas, the directed graph including a node for each ingredient of the sets of ingredient tuples of the set of product formulas;
   generating a weighted graph from the directed graph, the weighted graph having a weight assigned to each edge in the directed graph;
   modifying random walk models by incorporating the weight assigned to each edge into the random walk model;
   vectorizing the set of product formulas based on ingredients within the product formulas;
   feeding the random walks from the random walk models into a deep learning approach to determine a set of embeddings comprising ingredient embeddings and a set of ingredient vectors from the vectorizing, wherein the deep learning approach is run on data including ingredient recommendations; and substitute ingredient recommendation;
   generating, based on the weighted graph, an embedding module;
   deploying the random walk models on the weighted graph;
   building neural models for two or more positive formulas in the weighted graph by: extracting, using the random walk models, a subgraph with depth d; extracting n biased walks in the subgraph; and building a neural model for each entity in the weighted graph, wherein positive formulas are used to generate a weight of edges to provide the bias for the biased walks on the weighted graph, wherein positive examples are formulas that have a threshold level of market success;
   training, using a bias of the biased walks from the weight of the edges, a sequence-to-sequence neural network generated using a pairwise ranking loss functions derived from the neural models;
   augmenting the sequence-to-sequence neural network with the set of embeddings for the weighted graph as a sigmoid layer in the sequence-to-sequence neural network,
   wherein each node is represented with low-dimensional numerical formula vectors;
   deploying the embedding module to generate a new product formula by passing the set of ingredient embeddings through the sequence-to-sequence neural network using one or more of the neural models; and
   identifying, using the sequence-to-sequence neural network, a new ingredient tuple for the new product formula.

2. The method of claim 1, wherein generating the weighted graph further comprises:
   removing a subset of edges of the directed graph, the subset of edges having a weight below a first threshold.

3. The method of claim 1, wherein each ingredient tuple identifies an ingredient, an amount of the ingredient, and a set of categorical features of the ingredient.

4. The method of claim 3, wherein the set of embeddings include a set of formula embeddings and determining the set of embeddings further comprises:

determining a set of formula vectors based on the set of ingredient vectors, the set of formula vectors including a formula vector for each product formula of the set of product formulas.

5. The method of claim 1, further comprising:
generating a new formula based on the sequence-to-sequence neural network.

6. The method of claim 5, wherein generating the new formula further comprises:
generating a set of proposed formulas based on the sequence-to-sequence neural network;
eliminating a first subset of proposed formulas from the set of proposed formulas based on a similarity threshold to a formula of the set of product formulas; and
based on eliminating the first subset of formulas, selecting the new formula from a second subset of formulas remaining in the set of proposed formulas.

7. A system, comprising:
one or more processors; and
a computer-readable storage medium, coupled to the one or more processors, storing program instructions that, when executed by the one or more processors, cause the one or more processors to perform operations comprising:
accessing a set of product formulas, each product formula including a set of ingredient tuples;
generating a directed graph from the set of product formulas, the directed graph including a node for each ingredient of the sets of ingredient tuples of the set of product formulas;
generating a weighted graph from the directed graph, the weighted graph having a weight assigned to each edge in the directed graph;
modifying random walk models by incorporating the weight assigned to each edge into the random walk model;
vectorizing the set of product formulas based on ingredients within the product formulas;
feeding the random walks from the random walk models into a deep learning approach to determine a set of embeddings comprising ingredient embeddings and a set of ingredient vectors from the vectorizing, wherein the deep learning approach is run on data including ingredient recommendations, and substitute ingredient recommendation;
generating, based on the weighted graph, an embedding module;
deploying the random walk models on the weighted graph;
building neural models for two or more positive formulas in the weighted graph by: extracting, using the random walk models, a subgraph with depth d; extracting n biased walks in the subgraph; and building a neural model for each entity in the weighted graph, wherein positive formulas are used to generate a weight of edges to provide the bias for the biased walks on the weighted graph, wherein positive examples are formulas that have a threshold level of market success;
training, using a bias of the biased walks from the weight of the edges, a sequence-to-sequence neural network generated using a pairwise ranking loss functions derived from the neural models;
augmenting the sequence-to-sequence neural network with the set of embeddings for the weighted graph as a sigmoid layer in the sequence-to-sequence neural network, wherein each node is represented with low-dimensional numerical formula vectors;
deploying the embedding module to generate a new product formula by passing the set of ingredient embeddings through the sequence-to-sequence neural network using one or more of the neural models; and
identifying, using the sequence-to-sequence neural network, a new ingredient tuple for the new product formula.

8. The system of claim 7, wherein generating the weighted graph further comprises:
removing a subset of edges of the directed graph, the subset of edges having a weight below a first threshold.

9. The system of claim 7, wherein each ingredient tuple identifies an ingredient, an amount of the ingredient, and a set of categorical features of the ingredient.

10. The system of claim 9, wherein the set of embeddings include a set of formula embeddings and determining the set of embeddings further comprises:
determining a set of formula vectors based on the set of ingredient vectors, the set of formula vectors including a formula vector for each product formula of the set of product formulas.

11. The system of claim 7, wherein the operations further comprise:
generating a new formula based on the sequence-to-sequence neural network.

12. The system of claim 11, wherein generating the new formula further comprises:
generating a set of proposed formulas based on the sequence-to-sequence neural network;
eliminating a first subset of proposed formulas from the set of proposed formulas based on a similarity threshold to a formula of the set of product formulas; and
based on eliminating the first subset of formulas, selecting the new formula from a second subset of formulas remaining in the set of proposed formulas.

13. A computer program product comprising a computer readable storage medium having program instructions embodied therewith, the program instructions being executable by one or more processors to cause the one or more processors to perform operations comprising:
accessing a set of product formulas, each product formula including a set of ingredient tuples;
generating a directed graph from the set of product formulas, the directed graph including a node for each ingredient of the sets of ingredient tuples of the set of product formulas;
generating a weighted graph from the directed graph, the weighted graph having a weight assigned to each edge in the directed graph;
modifying random walk models by incorporating the weight assigned to each edge into the random walk model;
vectorizing the set of product formulas based on ingredients within the product formulas;
feeding the random walks from the random walk models into a deep learning approach to determine a set of embeddings comprising ingredient embeddings and a set of ingredient vectors from the vectorizing, wherein the deep learning approach is run on data including ingredient recommendations, and substitute ingredient recommendation;
generating, based on the weighted graph, an embedding module;

deploying the random walk models on the weighted graph;

building neural models for two or more positive formulas in the weighted graph by: extracting, using the random walk models, a subgraph with depth d; extracting n biased walks in the subgraph; and building a neural model for each entity in the weighted graph, wherein positive formulas are used to generate a weight of edges to provide the bias for the biased walks on the weighted graph, wherein positive examples are formulas that have a threshold level of market success;

training, using a bias of the biased walks from the weight of the edges, a sequence-to-sequence neural network generated using a pairwise ranking loss functions derived from the neural models;

augmenting the sequence-to-sequence neural network with the set of embeddings for the weighted graph as a sigmoid layer in the sequence-to-sequence neural network, wherein each node is represented with low-dimensional numerical formula vectors;

deploying the embedding module to generate a new product formula by passing the set of ingredient embeddings through the sequence-to-sequence neural network using one or more of the neural models; and identifying, using the sequence-to-sequence neural network, a new ingredient tuple for the new product formula.

14. The computer program product of claim 13, wherein generating the weighted graph further comprises:

removing a subset of edges of the directed graph, the subset of edges having a weight below a first threshold.

15. The computer program product of claim 14, wherein the set of embeddings include a set of formula embeddings and determining the set of embeddings further comprises:

determining a set of formula vectors based on the set of ingredient vectors, the set of formula vectors including a formula vector for each product formula of the set of product formulas.

16. The computer program product of claim 13, wherein the operations further comprise:

generating a new formula based on the sequence-to-sequence neural network.

17. The computer program product of claim 16, wherein generating the new formula further comprises:

generating a set of proposed formulas based on the sequence-to-sequence neural network;

eliminating a first subset of proposed formulas from the set of proposed formulas based on a similarity threshold to a formula of the set of product formulas; and based on eliminating the first subset of formulas, selecting the new formula from a second subset of formulas remaining in the set of proposed formulas.

* * * * *